METHOD OF MAKING DISPENSING CONTAINERS
Original Filed Aug. 21, 1964 3 Sheets-Sheet 1
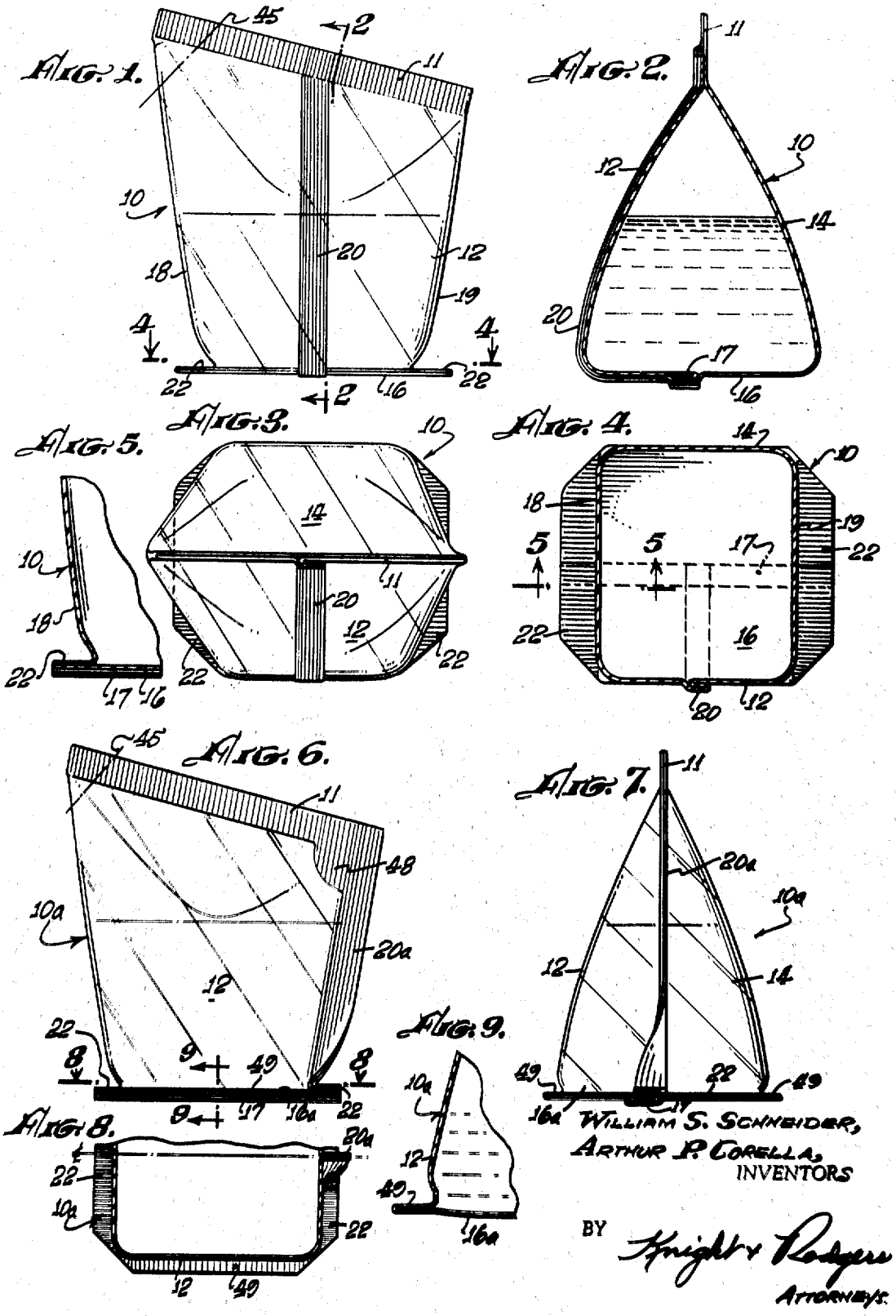

METHOD OF MAKING DISPENSING CONTAINERS

Original Filed Aug. 21, 1964 3 Sheets-Sheet 2

WILLIAM S. SCHNEIDER,
ARTHUR P. CORELLA,
INVENTORS.

BY Knight & Rodger
ATTORNEYS.

METHOD OF MAKING DISPENSING CONTAINERS

Original Filed Aug. 21, 1964 3 Sheets-Sheet 3

WILLIAM S. SCHNEIDER,
ARTHUR P. CORELLA,
INVENTORS.

By Knight & Rodgers
ATTORNEYS

United States Patent Office

Re. 27,302
Reissued Feb. 29, 1972

27,302

METHOD OF MAKING DISPENSING CONTAINERS

William S. Schneider, Glendale, and Arthur P. Corella, Hollywood, Calif., assignors of eleven and one-quarter percent to Wayne V. Rodgers, South Pasadena, Calif., and ten percent to Carl Schneider, Peninsula, Calif.

Original No. 3,552,087, dated Jan. 5, 1971, Ser. No. 650,077, June 29, 1964, which is a division of Ser. No. 391,130, Aug. 21, 1964. Application for reissue July 15, 1971, Ser. No. 159,146

Int. Cl. B65b *9/06*

U.S. Cl. 53—28 34 Claims

Matter enclosed in heavy brackets [ ] appears in the original patent but forms no part of this reissue specification; matter printed in italics indicates the additions made by reissue.

ABSTRACT OF THE DISCLOSURE

The method involves making a "stand-up" package from flexible film of the heat sealable variety, by crushing and flattening one end of a tube and then thermally molding or setting the film to form stiffened, self-sustaining folds.

CROSS REFERENCE TO RELATED APPLICATION

This application is a division of our co-pending application, Serial No. 391,130 filed Aug. 21, 1964, now abandoned, for "Dispensing Container."

BACKGROUND OF THE INVENTION

The present invention relates generally to packages made of thin, flexible webs or films on high speed form-and-fill machines; and it is more especially concerned with making from flexible film a dispensing-type package that can be set down, after opening, without causing the contents to leak out of the package. In the latter respect, the packages resemble bottles and other containers of rigid wall structures; but bottles and the like are relatively expensive and are, therefore, not well adapted to packaging small portions of a product.

Certain characteristics are obviously to be desired in a flexible package in order to make it possible to open the package and then set it down without having the contents leak out, as is the case with flat or envelope type packages. The advantage is that it is not necessary to discharge the entire contents of the package at one time so that the package can be used for temporary storage, whether a matter of minutes or substantially longer.

Obviously, a package for this purpose should have a base on which it can rest when on some surface, such as a table, and upon which the package is stable so that there is comparatively little danger of the package tipping over.

The flat or envelope packages have come into widespread use because they are comparatively inexpensive and are adaptable to a wide range of products and conditions. These envelope packages use inexpensive, flexible film. Machines for converting the flat film stock into packages are very highly developed and operate at high speeds. Such machines are commonly known as form-and-fill machines since they form the package, fill it, and seal the completed package in a continuous series of steps, with the result that packaging costs have been reduced to a very low value.

Thus it becomes a general object of the present invention to combine the production advantage of thin, flexible films with the stand-up characteristics of more rigid materials in a single package, thus enabling the economical production of a dispensing package that stands upon a definitely established base.

It is also an object of the invention to produce a package of novel design from thin, flexible film and having a definitely established and obvious base surface on which the package can rest in a stable position with the discharge opening at or near the upper end of the package.

More especially, it is an object of the present invention to make a package of novel design entirely from thin, flexible film, using either one or two webs as may be desired which has a definite base upon which the package can be made to stand up, such base being formed in the package without requiring the addition of any separate pieces which require separate forming steps or adhesion to another part of the package.

In terms of a method, it is an object of the present invention to devise a method of producing a package having the characteristics set forth above which is adapted to production on standard types of form-and-fill machines with a minimum of modification in the machines, thus enabling advantage to be taken of all the engineering and production techniques now available.

More especially it is an object of the present invention to devise a method of producing a dispensing package having the above characteristics, using machines that form transverse seals in a tubular web in a well-known manner and modifying the forming operations to produce the desired package.

SUMMARY OF THE INVENTION

The above and other objects of the invention are attained in a package embodying the present invention by providing a tube of thin, flexible material with opposing marginal portions of the tube at each end thereof sealed together to form transversely extending end seals. A portion of the package wall adjoining one end seal is crushed and flattened to dispose the wall generally in a plane extending transversely to the longitudinal axis of the tube to form a base upon which the package can rest. The base is thermally molded or set, after flattening, to maintain an angular relation between the base and the adjoining sides of the package so that the base is definitely established and maintained. Finally, the container thus made is filled and closed.

In order to mass produce a package of this character, the web of thin, flexible material is formed around a mandrel into a tube, the tube is then sealed transversely at one end at a position spaced from the end of the mandrel, a terminal portion of the tube at the sealed end of the tube is then deformed in a suitable manner, as by flattening against a surface lying in a plane transverse to the axis of the tube, the flattening operation bringing a portion of the tube wall into position to provide a bottom wall extending across the base of the tube, generally normal to the tube axis. The operation also brings into opposing position areas of the material in the flattened zone.

Next, the base configuration and the angular relation of the bottom wall and the side walls are stabilized. This can be done by various operations, either alone or in combination with each other. One such operation is to apply heat and pressure around the perimeter of the base to thermally mold the angle at the junction of the bottom wall and side walls. Instead, or in addition, the opposing folded areas in the flattened zone may be sealed together face-to-face to establish and maintain the base on the completed package. After introducing a product into the tube through the open upper end thereof, the package is completed by closing the tube with a transversely extending seal placed above the level of the product in the tube.

The base is preferably circular in outline. When the base is polygonal in form, preferably having four sides, seals are placed at a minimum of two opposite sides of the base. In addition thereto, the walls may be pinched together at two additional sides to provide sealed areas at the other sides of the base.

BRIEF DESCRIPTION OF DRAWING

How the above objects and advantages of the present invention, as well as others not specifically mentioned herein, are attained will be more readily understood by reference to the following description and to the annexed drawings, in which:

FIG. 1 is a side elevation of a dispensing container made of thin, flexible material and embodying the present invention.

FIG. 2 is a vertical section substantially on line 2—2 of FIG. 1.

FIG. 3 is a plan view of the package of FIG. 1.

FIG. 4 is a horizontal section on line 4—4 of FIG.1.

FIG. 5 is a fragmentary section on line 5—5 of FIG. 4.

FIG. 6 is a side elevation of a variational embodiment of the invention.

FIG. 7 is a side elevation thereof.

FIG. 8 is a horizontal section on line 8—8 of FIG. 6.

FIG. 9 is a fragmentary vertical section on line 9—9 of FIG. 6.

DESCRIPTION OF PERFERRED EMBODIMENT OF THE INVENTION

Figures 10, 11, 12, 13:
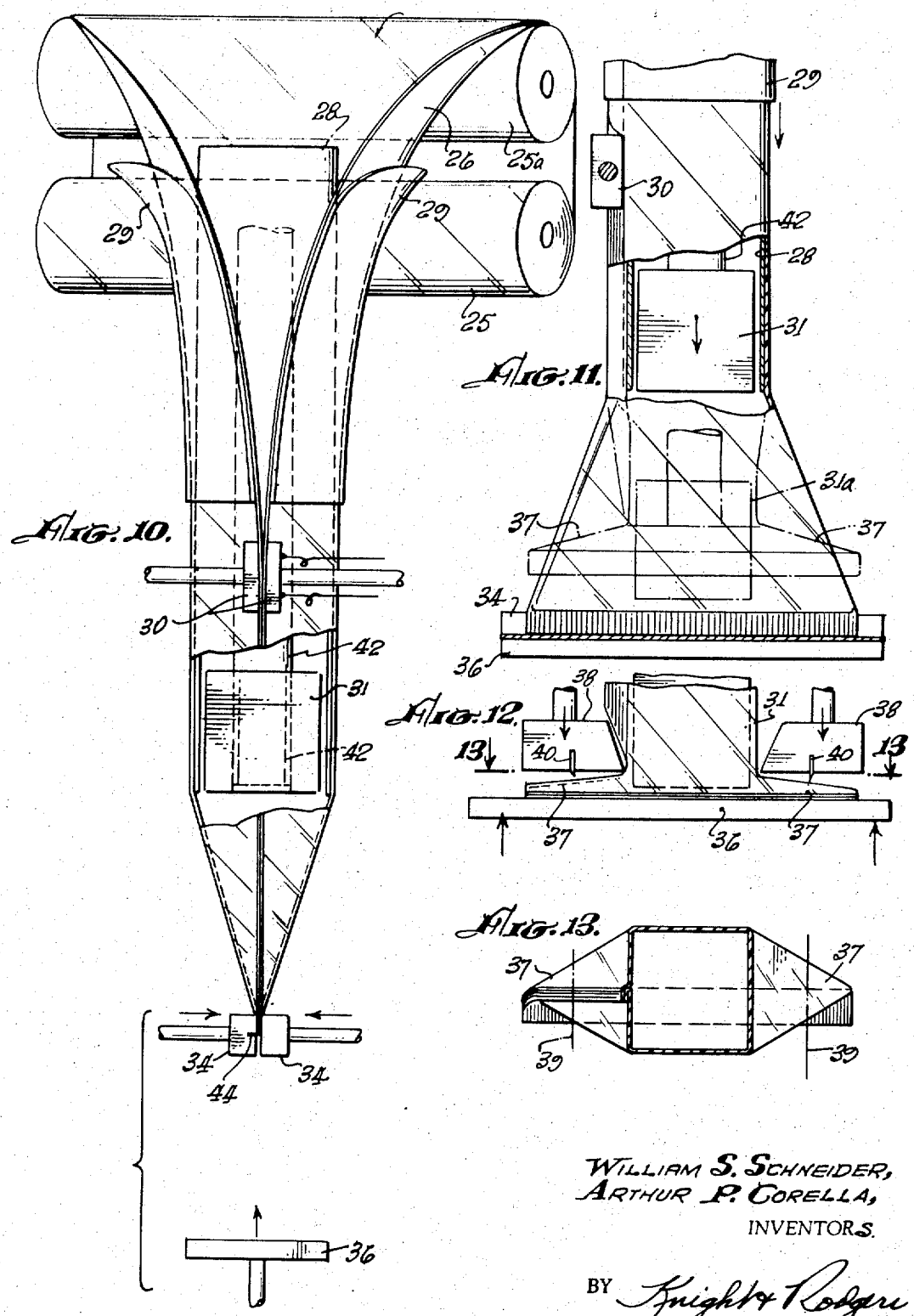
FIG. 10 is a diagram of a mandrel and sealing heads showing successive steps in the formation of the various seals for the package.
FIG. 11 is a diagrammatic view, looking from the right in FIG. 2, showing one step in the formation of the package wherein the portion adjacent one end seal is flattened and flattened portions are sealed together.
FIG. 12 is a diagramamtic view showing the step of forming auxiliary folds by pinching side walls of the package and sealing them together at the base.
FIG. 13 is a diagrammatic view showing the trimming operation.
Figure 14:
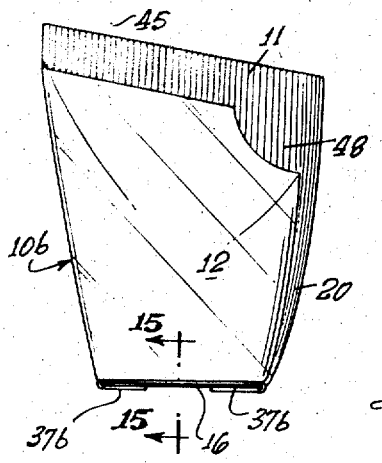
FIG. 14 is a side elevation of a variational form of dispensing container embodying the present invention.
Figure 16:
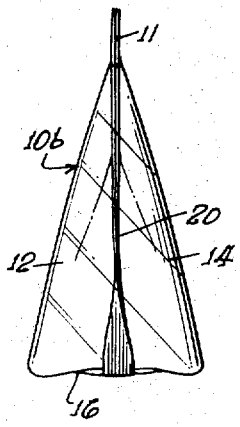
FIG. 16 is a side elevation thereof, viewed from the right in FIG. 14.
Figure 15:
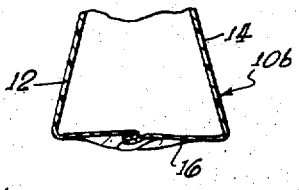
FIG. 15 is a fragmentary section on line 15—15 of FIG. 14.

Referring now to the drawings, and especially to FIG. 1 thereof, there is indicated at 10 a package constituting one typical embodiment of the present invention. It will be seen that the package 10 has along the top a transversely extending seal 11 closing the upper end of the package. Adjacent this transverse seal, the package resembles the familiar flat package since at seal 11 it has only two side walls 12 and 14 which oppose each other and which are sealed together at seal 11.

At the other or lower end of the package, it is provided with a base 16, which in this embodiment is a polygon with preferably four more or less equal sides. In the broad aspect of the invention, the base may be circular as described later or it may have any number of sides desired with a minimum of three; but if a polygon, for practical reasons a generally rectangular base is preferred. Extending across the base is a second transverse seal 17, shown particularly in FIGS. 4 and 5. Seal 17 is formed in the same manner as seal 11 and is normaly parallel thereto, for seasons which will become apparent as the description progresses; but the invention is not necessarily limited thereto.

By virtue of having a four-sided base, it will be seen that for most of its height the package has side walls 18 and 19 in addition to the previously mentioned side walls 12 and 14. The two side walls 18 and 19 may be seen by reference to FIG. 2, as being generally triangular in shape, while the walls 12 and 14 are narrower at the base than at the top. Along side wall 12 the package has a longitudinally extending seam 20 which extends for the full length of the package and crosses both end seals 11 and 17 at some position between their ends, preferably more or less centrally of the end seals in the preferred embodiment of the package. When the package is made from a single web, as described later, there is only one longitudinally extending seam 20; but the package may be made from two webs if desired, in which case there are two longitudinal seams, one at each side of the package.

Individual packages can also be made from seamless tubing, in which case there is no seam 20; but seamless tubing is not easily adapted to large scale production.

Base 16 and the four side walls of the package are all integral with one another. In order to maintain an angular relationship between the base and the side walls and to define or establish the portion of the package walls constituting the base, means are provided at the base for stabilizing or maintaining the configuration of the base and bottom wall, including this angular relationship. Such means includes a pair of self-sustaining folds 22 in the web from which the package is made. While the method of forming these folds will be explained later, it may be seen from FIG. 1 that these folds are located along two opposite sides of the base. Each fold consists of portions of the web which are brought into face-to-face relationship to each other and sealed to each other to maintain the folds, since otherwise the weight of the contents in the package could cause the folds to disappear.

Reference will now be made to FIGS. 10–13 which illustrate in diagrammatic form the manufacture of the package just described.

The package may, in its broader aspects, be considered as being made from a tube of plastic material, because this is a starting point in the manufacture of the package and the invention is independent of how the plastic tube is produced. For example, the package may be formed from a length of seamless tubing.

The more common practice in high speed packaging machines is that illustrated in FIG. 10 in which the tube is formed from a flat web or sheet 26 or material normally withdrawn from a supply roll. The web 26 withdrawn from the roll is a thin, flexible material, preferably of such a nature that the inside faces of the container can be sealed together by the application of heat and pressure, as is well known in the art. In a typical case, the web may be a material such as cellulose acetate film, commonly known as "cellophane," coated with a layer of polyethylene about 2–3 mils thick on one side to render the film heat sealable on that side. Of course, it is within the scope of the invention to use webs of other material, including webs that are heat sealable on two sides or those which require the addition of an adhesive in order to form the seals.

Web 26 when withdrawn from supply roll 25 is initially flat but is passed over idler 25a and then formed into a continuous tubular shape around mandrel 28 by drawing the web inside a forming member 29 around the mandrel which shapes the web into the desired tube. After passing through former 29, the web has longitudinally extending marginal portions brought into inside-face-to-inside-face relation such that these portions can then be sealed together by the application of heat and pressure applied through a pair of movable sealing heads 30 which periodically reciprocate toward and away from each other to engage these marginal portions of the web. After passing between the sealing heads, the tubular formation is completed and it moves down along the mandrel. The invention is not limited to this particular type of longitudinal seal, as other types, for example, a lap-type seam, may be used.

The upper part of the mandrel is preferably circular to facilitate formation of the web into a tubular configuration. In order to obtain the desired rectangular shape for the base of the package, suitable forming means may be used. As an example, plunger 31 movable within and relative to mandrel 28 may be rectangular in cross section to give the desired shape to the final package. In this situation the mandrel may or may not gradually change somewhere along its length from circular cross section to rectangular cross section near its lower end. Mandrel 28 is hollow in order to permit filling the package, as is common practice in the art, and to accommodate plunger 31 which serves as an extension of the mandrel, as will be seen.

At a position spaced a short distance below the lower end of mandrel 28, there is another pair of reciprocating sealing heads 34 which are adapted to engage the tubular web from opposite sides and flatten it between the pair of heads 34 for the purpose of forming the transversely extending seal at one end of the package. Actually, the seal so formed may close opposite ends of two successive packages; but for purposes of description here, it need only be considered at this time as closing the lower end of the tube and forming end seal 17 of the finished package. Heads 34 bring the walls of the package into inside-face-to-inside-face relation to place this transverse seal.

By reference to FIGS. 10 and 11, it will be seen that the tubular web is disposed around the entire perimeter of the lower section of the mandrel. However, at the sealing heads 34, the tubular configuration of the web changes to a flat one, since the transverse seal 17 lies substantially in a single, axial plane.

As the initial step in crushing the end of the tube to shape the base of the package, plunger 31 is lowered from the solid line position (FIG. 10) to the broken line position 31a of FIG. 11. This is the same as extending or lowering the mandrel within the web tube and stretches the web around the plunger. A portion of the web tube adjacent to and including a part of seal 17 is now stretched across the bottom face of plunger 31 where it becomes the bottom wall 16 of the package. In so doing seal 17 may be raised somewhat to the broken line position (FIG. 11) and two triangular folds 37 are formed, one at each of two opposite sides of the mandrel, as in FIG. 13.

The next operation is to flatten the transverse seal 17 at the lower end of the tube and the adjoining portion of the tube below the mandrel by relative movement with respect to a plane surface disposed transversely of the axis of the tube. This can be accomplished after sealing heads 34 are retracted and separated, by moving upwardly against the lower end of plunger 31 a plate 36, as is indicated in FIG. 12. In this operation, transverse seal 17 is bent over through approximately 90 degrees along its upper horizontal edge so that it lies flat against the upper surface of plate 36, while a portion of the web adjoining the seal is also flattened and folded to form more definitely the laterally projecting triangular folds 37. At opposite sides of the tube, these folds are formed in much the same way as one folds the ends of a piece of wrapping paper as a first step in folding around the end of a rectangular box. This flattening brings into contact, inside-face-to-inside-face, the double thickness flattened and folded portions of the tube which now lie against plate 36 and extend laterally beyond the web tube at 37, as shown in FIGS. 12 and 13.

While plate 36 is in the raised position shown in solid lines in FIG. 12, the opposing walls at 37 can be sealed together by the application of heat and pressure applied through a pair of sealing heads 38, one at each side of the mandrel, which are movable downwardly against the laterally projecting portions of the web, as indicated diagrammatically in FIG. 12.

These projecting web portions 37 may project laterally an objectionably great distance. Consequently, it may be preferred to trim off the ends of the projections along the dotted lines 39 in FIG. 13, leaving attached to the package only the portions shown at 22 in FIG. 4 in solid lines. This can be accomplished by means of trimming blades 40 carried by sealing heads 38. While maintaining sealing heads 38 in lowered position to grip web extensions 37 between the heads and plate 36, simultaneous downward movement of plate 36 and heads 38 now draws the tubular web downwardly over the mandrel to advance the web a package length below heads 34.

The package is now in condition for filling and this is accomplished by introducing a product into the web tube through its open upper end. As mentioned before, mandrel 28 is hollow in order to permit introduction of the desired product into the package through suitable supply tube 42, which is also the means for raising and lowering plunger 31. After the product is inserted and the package filled, the package is completed by closing it. This is accomplished by placing a transverse seal with sealing heads 34 at a position on the tube above the product level. The filled packaged is then severed from the following web by cutting through the web within the sealed area, this being accomplished conveniently by a cutting blade 44 carried by one of the sealing heads 34, as indicated diagrammatically in FIG. 10. The mechanisms are well known in the industry and are not necessary to an understanding of the present invention.

From the foregoing description, it will be noticed that the transverse seal placed by sealing heads 34 is actually divided into two parts by the cut made by knife 44. The lower portion becomes transverse seal 11 closing one package at its upper end after the product is inserted as just described, while the upper portion of the seal becomes transverse seal 17 at the bottom of the next package, this seal closing the end of the tube preparatory to conditioning the tube for forming the next package.

The lateral extensions 37 each comprise two opposing areas of the original web of the tube which have been brought into face-to-face, opposing relationship and then sealed together by the application of heat and pressure. These may be regarded as folds in the web or tube. Placing them at the base of the package serves not only to delineate the base 16, since one edge of the sealed areas defines one edge of the base, but these folds are self-sustaining in nature by virtue of sealing together portions of the web and thus they serve to maintain the established angular relationship between the base and the side walls of the package. Base 16 being thus adequately defined and established, it is likewise maintained after the package is filled with a product so that weight of the product does not cause the folds to disappear. As a result, the base provides a stable surface upon which the package can rest in an upright condition.

The contents of the package are discharged by forming an opening at the upper end by cutting or tearing off a corner of the package along a line such as is indicated at 45. The discharge opening thus formed is above the product level at all times and is at the end of the package removed from the base.

From the foregoing description of a preferred embodiment of the package and a method of making it, variations therein will occur to persons skilled in the art but within the scope and spirit of the present invention. Among such variations, two are illustrated herein. FIGS. 6–9 illustrate a package 10a which is made in the manner previously described except as noted below. One evident change is in the location of the longitudinal seam by which marginal portions of the web sheet are joined together to form the tube. In this embodiment of the invention, the longitudinal seam 20a is displaced from its prior position approximately 90 degrees around the periphery of the package so that the seam is in prolongation of transverse seal 11. In this location, the longitudinal seam projects outwardly from the body of the package. In this respect, it differs from the package previously described since there the seam 20 is folded over against the outer surface of the container, as shown particularly in FIGS. 2 and 3. The seam 20 is held in this position by following around the convex outer surface of the package and being bent as it passes from side wall 12 around to the underside of base 16. The curvature thus introduced into the seam 20 causes it to stay down in its folded position against the outer surface of the package.

However, advantage may be taken of the outstanding characteristic of the longitudinal seam 20a to provide a location for naturally picking up the package to pour out the contents. With this construction, it is natural to pick up the package between the thumb and forefinger at the junction of the top transverse seal 11 and the longitudinal seam 20a; and this area may be enlarged and made more prominent by rounding the interior corner of the junction of these two sealed areas as indicated at 48 in FIG. 6.

The embodiment of FIGS. 6–9 also illustrates another modification of the package which, if desired, can also be incorporated in the package illustrated in FIGS. 1–5. This involves the addition to the package of two self-sustaining folds 49 at two opposite sides of the package. The folds 49 are similar to folds 22 previously described, but they are disposed at the two remaining sides of the base. Like folds 22, they serve to delineate more definitely the base, since straight edges of the folded and sealed areas 49 define two sides of the base 16a and they also serve to assist and maintain the desired angular relationship between the side walls and the base.

There is a slight difference in the way in which these folds are made as compared to folds 22 since the areas to be folded may be not brought into opposition to each other by the act of flattening the end of the package. Instead, a tuck or fold is taken in each of the side walls 12 and 14 at such a position that the folds 49 thus formed extend laterally out beyond the package in substantial extension of the base 16 of the package.

FIGS. 14–18 illustrate another shape of package which has a round base instead of a polygonal base as previously described and which results from certain modifications in the previously described manufacturing steps. Package 10b illustrated in FIGS. 14–18 is similar in most respects to the package shown in FIGS. 6–9 and described above; and the differences between the two will now be described.

The construction of the package 10b is most easily understood from a description of the steps followed in its manufacture. This package is made in the same manner as previously described, as far as the steps illutrated in FIGS. 10 and 11. One difference, of course, is that mandrel 28 and plunger 31 are both circular in cross section, not polygonal as previously described. The plunger is still a loose fit within the mandrel and movable relative thereto in order to act as a retractable extension of the mandrel which is lowered from within the mandrel to expand the end of the tube and draw the portion of the tube adjacent transverse seal 17 across the end of the plunger to form the bottom wall of the package.

Figure 18:
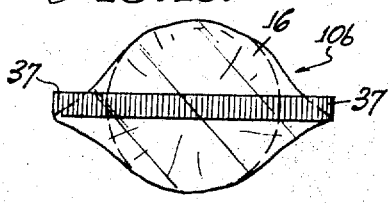
FIG. 18 is a bottom view of the container of FIG. 14 at one stage in its formation, as on line 18—18 of FIG. 19.
Figure 17:
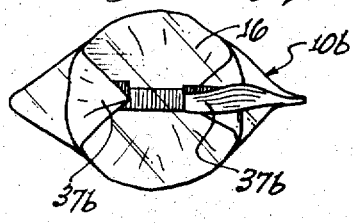
FIG. 17 is a bottom view thereof.

At the end of this operation, the tube appears as illustrated in FIG. 18 with portions of the web tube at 37 extending laterally outwardly from the tube at two opposing positions. In each of these extensions 37, areas of the original web have been brought into face-to-face relationship, but as yet have not been sealed together.

Figure 19:
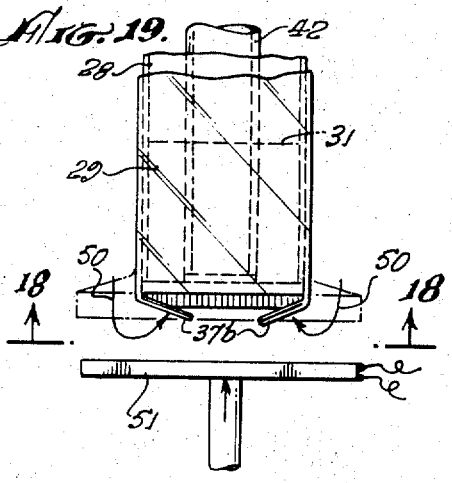
FIGS. 19 and 20 are diagrams showing various stages in forming the package of FIGS. 14–18.

The next operation is shown in FIG. 19 and constitutes an addition to the package forming operations previously described. Here, the lateral extensions 37 are folded through approximately 180 degrees to tuck them underneath plunger 31 and the package 10b, as indicated by arrows 50. These extensions are now moved from the dotted line position to the full line position indicated at 37b in FIG. 19. Any suitable means for performing this folding or tucking operation may be employed, none being shown in the drawing.

Figure 20:
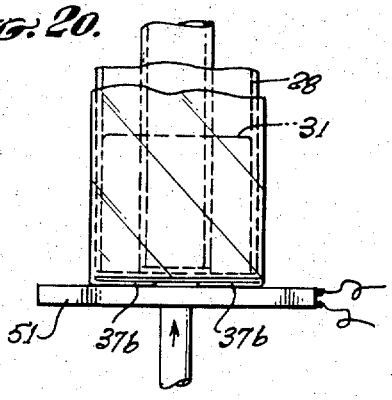

The final operation in forming the base of the package is now performed by raising sealing head 51 upwardly from the position of FIG. 19 to the position of FIG. 20 where all the portions of the web at the base of the package are held between sealing head 51, which is heated, and plunger 31. Remembering that the web is made of heat sealable material, it will be realized that in this one operation the opposing areas in the extensions 37b are sealed together face-to-face at the same time that the extensions are pressed firmly against the end of plunger 31. Also, transverse seal 17 is folded over to lie flat against the bottom wall of the package, in the position shown in FIG. 15. *The flattened bottom is now moved down one package length below the heads 34 by any suitable means which may include, for instance, the movement of the plunger 31 down with the sealing head 51 while the base is being pressed between the members as shown in FIG. 20. After the flattened bottom is moved down, the package is then filled and sealed.*

The characteristic of this last-mentioned step of forming the base of the package, not present in the procedures described above, is that the heat and pressure applied by sealing head 41 thermally mold the web around the entire perimeter at the base of the package to maintain the angular relation at the junction of the base and side walls of the package. Upon withdrawing sealing head 51 and allowing the package to cool, the package sets in the shape given to it and to the configuration of the base and bottom wall are stabilized both by the formation of the self-sustaining folds and by the thermal molding at the junction of the bottom and side walls. The bottom of the completed package appears as in FIG. 17. It will be understood, of course, that the circular outline of the base may be altered if desired, and is not necessarily restrictive upon the scope of the invention.

Other modifications and changes in the detailed construction and manufacture of the package constituting the invention may occur to persons skilled in the art but without departing from the spirit and scope of the invention. Accordingly, it is to be understood that the foregoing description is considered as being illustrative of, rather than limitative upon, the invention as disclosed herein.

We claim:

1. The process of making a filled package that includes the steps of closing one end of a tube of thin, flexible material that is heat sealable on the inside face by flattening the tube transversely and sealing together the walls of the tube inside-face-to-inside-face over a transversely extending area;

deforming a terminal portion of the tube adjoining said transverse seal by axially flattening said terminal portion to form a base *including a bottom wall* of substantially the same perimeter as the tube disposed generally normal to the axis of the tube;

stabilizing the configuration of the base and bottom wall by sealing together in inside-face-to-inside-face relation portions of the tube material brought into opposing relation by axially flattening the terminal portion of the tube;

introducing a product into the tube through the open end thereof; and finally closing the package by placing a seal above the product level.

2. The process of making a filled package that includes the steps of closing one end of a tube of thin, flexible material that is heat sealable on the inside face by flattening the tube transversely and sealing together the walls of the tube inside-face-to-inside-face over a transversely extending area;

deforming a terminal portion of the tube adjoining said transverse seal by axially flattening said terminal portion by moving the first mentioned seal axially and relative to the tube to form a bottom wall generally normal to the tube axis with folds of generally triangular shape formed from surplus material disposed outwardly of the perimeter of the tube;

folding the triangular shapes against a wall of the package, thereby forming a base of substantially the same perimeter as the tube disposed generally normal to the axis of the tube;

stabilizing the configuration of the base and bottom wall;

introducing a product into the tube through the open end thereof; and finally closing the package by placing a seal above the product level.

3. The process of making a filled package as claimed in claim 2 that also includes the step of folding under the bottom wall said triangular folds and sealing together opposed walls of said triangular folds under the bottom wall.

4. The process of making a filled package as claimed in claim 1 in which the stabilizing step includes folding the transverse seal over against the bottom wall during and as a part of the axial flattening of said terminal portion of the tube and subsequently producing a permanent set to the material of the transverse seal and the tube at the junction of the base and the side walls of the package.

5. The process of making a filled package as claimed in claim 1 in which the stabilizing step includes applying heat and pressure around substantially the entire perimeter of the base to thermally mold the transverse seal and the material of the tube to maintain an angular relation between the base and the side walls of the package.

6. The process of making a filled package that includes the steps of sealing one end of a tube of thin, flexible material that is heat sealable on the inside face by flattening the tube transversely and sealing the walls together at a position spaced from one end of a mandrel inside the tube to produce a seal extending at its ends beyond the tube;

axially flattening a portion of the tube at the sealed end against a surface lying in a plane transverse to the axis of the tube to form a bottom wall and folds of generally triangular shape including end portions of the transverse seal and extending outwardly beyond the tube;

sealing together opposing areas of triangularly shaped folded material in the flattened zone to form self-sustaining folds in said zone;

introducing a product into the tube through the open end thereof; and closing the package.

7. The process of making a filled package as claimed in claim 6 in which the side wall of the tube is pinched together to form a fold adjacent the plane of the bottom wall and sealed along two opposite sides of the bottom wall.

8. The process of making a filled package as claimed in claim 6 in which the tube is formed by folding two flat webs of equal width around a mandrel and joining opposed longitudinal margins of the webs by a sealed area extending longitudinally of the mandrel; and in which the two longitudinal seals are at the respective ends of the two transverse seals.

*9. A machine for forming, filling and closing packages made from a continuous web of flexible material having tube forming means for forming said web into a length of tube wherein said web is guided through a tube forming means which has a top entry end and a bottom end, means below said bottom end of said tube forming means for placing a transverse seal across the end of a length of the tube; the improvement comprising means for forming a base at the sealed end of the tube in stages of shaping and flattening, said base forming means including an internal member within the tube wherein an end surface of said internal member faces the interior sealed end of the tube; means for effecting a relative movement between the tube and said internal member to the extent that said internal member engages the material of the tube in the vicinity of the sealed end thereof and effects an expansion and opening of the tube at and adjacent to the sealed end to define a base area and to partially shape and partially flatten a base on the tube; and further shaping and flattening means for pressing the transverse seal flatly folded against the base area and which includes an external base forming member cooperable with said internal member for pressing the partially shaped and partially flattened base and the transverse seal between said internal member and said external base forming member to substantially flatten the base in a plane between said members; means for placing a product in the package on the flattened base; means for closing the package; and drive means for operating all of said means in timed relation to each other.*

*10. A machine as claimed in claim 9 including means to stabilize the folded and pressed transverse seal whereby it remans in its pressed position after said members have been separated.*

*11. A machine as claimed in claim 9 wherein said tube forming means are of the type for forming the tube in an open state, said means for placing a transverse seal is of the type requiring the collapsing of an end portion of the tube adjacent the transverse seal, and said base forming means are operable to reopen the collapsed end portion of the tube.*

*12. A machine as claimed in claim 9 wherein said tube forming means comprises means to guide the web and to shape the tube to a predetermined section, and longitudinal tube sealing means adjacent said tube forming means to seal the longitudinal edges of the web together into the tube; and wherein said means for placing a transverse seal across the tube comprise a pair of opposing transverse sealing heads with means to close them at a fixed vertical position to place the transverse seal across the tube and then to separate them to positions remote from the tube; and further means to reciprocally advance said external base forming member to an operative position for said pressing of the base and then to withdraw it from said operative position, said operative position being that position whereby the partially shaped and partially flattened base and the transverse seal are pressed between said internal member and said external base forming member; tube advancing means including means for cyclically applying pressure to the tube material to impart a downward movement to the tube whereby the flattened base is moved downward to a position one package length below said fixed vertical position during a time interval when said heads are in their said separated position; and wherein said drive means sequentially times the engagement of said members to substantially flatten the base, to withdraw said external base forming member from said operative position, and to advance the base a package length below said fixed vertical position.*

*13. A machine as claimed in claim 12, wherein said tube forming means comprises a stationary outer tube shaping member over which the web passes and an inner hollow mandrel around which the web forms into the tube with the tube being of slightly greater perimeter than said hollow mandrel, and wherein said hollow mandrel is the internal member and the means through which the package is filled.*

*14. A machine as claimed in claim 12, wherein said tube forming means comprises a stationary outer tube shaping member over which the web passes and an inner hollow mandrel around which the web forms into the tube with the tube being of slightly greater perimeter than said hollow mandrel, and wherein said internal member is a mandrel extension.*

*15. A machine as claimed in claim 14 wherein said mandrel extension has a retracted position telescoped within said inner hollow mandrel.*

*16. A machine as claimed in claim 14 wherein said mandrel extension has a product supply passage therethrough.*

*17. A machine as claimed in claim 14 wherein said mandrel extension has a product supply tube extending therethrough and secured thereto, said product supply tube forming a support for said internal member.*

*18. A machine as claimed in claim 12 wherein said means for pressing and substantially flattening the base comprises means mounting said external base forming member for movement to press the base against said internal member.*

*19. A machine as claimed in claim 12, wherein said means for effecting a longitudinal relative movement between said internal member and the tube thereon comprises means to move said internal member longitudinally within said tube to a stop point whereat the internal member has engaged and stretched the material at the sealed end of the tube and has positioned it for substantial flattening.*

*20. A machine as claimed in claim 12 wherein said means for cyclically applying pressure to the tube material includes means cooperable with said external base forming member for clamping and flattening at least a portion of the base area of the tube and for moving downward with said external base forming member while so clamping and flattening the tube wherein the substantially flattened base is completed at a position one package length past said fixed vertical position.*

*21. A machine as claimed in claim 9 wherein said means for effecting relative movement effects longitudinal relative movement between the tube and said internal member.*

*22. The process of forming, filling, and closing a package made from a continuous web of flexible material that includes the steps of: forming said web into a length of tube by passing said web through a tube former, forming a transverse seal across the end of said tube, effecting relative movement between said tube and an internal member within said tube with the internal member engaging the material of said tube in the vicinity of the sealed end thereof and expanding said tube transversely to define a bottom wall while drawing said transverse seal longitudinally relative to said tube to shorten said tube as its end is expanded and becomes a partially shaped and partially flattened base area, folding said transverse seal toward and proximal to said base area to position it for flattening, pressing said partially shaped and partially flattened base area and said folded transverse seal between the internal member and an external base forming member to substantially flatten said bottom wall in a plane between the members, placing a product in said tube through the unsealed end, and finally placing a closing seal across the package.*

*23. The process of claim 22 which includes the step of stabilizing said folded and pressed transverse seal so that it remans in its pressed position after the internal member and the external base forming members are separated and the package is self-supporting.*

*24. The process of claim 22 wherein the expanding of the material at the sealed end of said tube by relative movement between the internal member and said tube is effected by relative longitudinal movement between said tube and the internal member.*

*25. The process of claim 24, wherein the pressing of said partially shaped and partially flattened base area and said folded transverse seal is caused by the external base forming member moving and pressing said base area against the internal member.*

*26. The process of claim 22 wherein said tube is formed as an open tube, a portion of said tube adjacent said transverse seal is partially collapsed in the forming of said transverse seal, and said collapsed tube portion is opened during said expanding of said tube.*

*27. The process of forming and filling a tube with a stand-up base from a continuous web of flexible material that includes the steps of: passing said web over an outer tube shaping member to shape a length of open tube, collapsing an end portion of said tube and placing a transverse seal across the end of said tube, utilizing an internal member disposed within said tube including effecting relative movement of the internal member and said tube and expanding and opening said collapsed tube to define a base area and to partially shape and partially flatten a base on said tube, folding said transverse seal against an adjacent portion of said tube and thereafter stabilizing said transverse seal in its folded position to provide for a stabilization of said base, and introducing a product into said tube through the unsealed end of said tube.*

*28. The process of claim 27, wherein the step of partially shaping and partially flattening also includes said step of folding said transverse seal toward and proximal to said base area to position it for flattening.*

*29. The process of claim 27 together with the additional step of pressing said partially shaped and partially flattened base between the internal member and an external base forming member to substantially flatten said base in a plane between the members.*

*30. The process of claim 27 wherein the expanding of the material at the sealed end of said tube by relative movement between the internal member and the tube is effected by relative longitudinal movement between the tube and said internal member.*

*31. The process of making and filling a package with a stand-up base from a flexible tube closed transversely at one end and open at the other that includes the steps of: stretching the material at the closed end of said tube across an end surface of an internal base forming member within said tube to define a base area and to partially shape and partially flatten a base on said tube whereafter surplus material extends from the base, folding said surplus material against a wall of the package, pressing said partially shaped and partially flattened base between the internal base forming member and a flat external base forming member to substantially flatten the base in a plane between said members, placing a product in said tube through the unsealed end, and finally placing a closing seal across the package.*

*32. The process of claim 31, wherein the step of stretching the material at the closed end of said tube comprises a longitudinal relative movement of the internal base forming member and said tube thereon to stretch said closed end.*

*33. The process of claim 32 together with the further step of stabilizing said base.*

*34. The process of claim 31 wherein the step of stretching the material at the closed end of the tube also comprises moving said internal base forming member relative to the tube whereat the internal base forming member is opposed by the external base forming mem-*

*ber and from which position the internal base forming member is thereafter retracted.*

References Cited

The following references, cited by the Examiner, are of record in the patented file of this patent or the original patent.

UNITED STATES PATENTS

| | | | |
|---|---|---|---|
| 3,263,391 | 8/1966 | Wallsten | 53—28 |
| 3,048,951 | 8/1962 | Oler | 53—28 |

| | | | |
|---|---|---|---|
| 3,306,001 | 2/1967 | Peppler | 53—28 X |
| 2,229,864 | 1/1941 | Moore | 53—46 X |
| 3,091,902 | 6/1963 | Rheinhardt et al. | 53—28 |
| 3,325,961 | 6/1967 | Lindh et al. | 53—40 X |
| 3,332,198 | 7/1967 | Thesing | 53—28 |

THERON E. CONDON, Primary Examiner

S. F. DESMOND, Assistant Examiner

U.S. Cl. X.R.

53—180